3,258,354
FILM-FORMING COMPOSITIONS CONTAINING CELLULOSE CRYSTALLITE AGGREGATES

Orlando A. Battista, Drexel Hill, Pa., assignor, by mesne assignments, to FMC Corporation, San Jose, Calif., a corporation of Delaware
No Drawing. Filed Nov. 29, 1962, Ser. No. 241,062
13 Claims. (Cl. 106—163)

This application is a continuation-in-part of application Serial No. 47,905, filed August 8, 1960 and now abandoned.

The invention relates to coating or film-forming compositions, such as paints, and particularly to paint-forming mixtures which are reconstitutable to paint of desired consistency by the addition of conventional materials, such as paint thinners.

The paint-forming mixtures of the invention provide for various and sundry advantages and may range, in consistency, from viscous fluids or plastic pastes to substantially or apparently dry free-flowing particles or granules. Aside from simplifying packaging, transit and storage of paints the mixtures of the invention, and especially those in a substantially dry and free-flowing condition, eliminate or at least minimize the formation of thick covering skins or membranes which are frequently formed in paints upon standing. The mixtures may be reconstituted as needed, as for example in an amount sufficient for a particular painting operation or schedule, and provide paints having good and controllable spreadability, covering power, drying rate, and texture.

The mixtures of the invention are obtained simply by mixing the film-forming or paint material with mechanically disintegrated cellulose crystallite aggregates that are characterized by having an average level-off D.P. (degree of polymerization), or of certain derivatives of cellulose crystallite aggregates. As heretofore mentioned, the paint-forming mixtures may vary in consistency merely by varying the amount of the cellulose crystallite aggregates or derivatives thereof which are employed. As an example, blending about 84 parts of a conventional enamel paint, by weight, with about 16 parts of the crystallite aggregates, by weight, provides a paint-forming mixture which is in the form of a thick or stiff and heavy plastic paste, while increasing the amount of crystallite aggregates to about 38 parts by weight provides a substantially or apparently dry and free-flowing particulate or granular mixture.

Considering the film-forming materials in more detail, they are generally characterized as flowable or liquid compositions which are converted into solid films after being applied as thin layers. More specifically, the film-forming materials are characterized as incorporating a mixture of pigments and/or resinous components in a suitable liquid vehicle or binder, and include conventional oil and water-based paints and varnishes. Generally, oil-based paints and varnishes are characterized as comprising a vehicle including a drying oil, thinner and drier within which is dispersed a pigment. The drying oil cooperates with the pigment in creating opacity and imparts continuity to the paint as it is applied. As the paint is applied in a thin layer, the drying oil is converted into a solid by chemically reacting with oxygen of the air and by polymerization. Drying oils most commonly employed are linseed, soybean, tung, oiticica, dehydrated castor oil, and fish oils extracted from the menhaden and sardine, with linseed oil being preferred. The drying rates of these oils are usually accelerated by mixing and cooking the oils with oil-soluble compounds of lead, manganese and cobalt, referred to as driers. The consistency of conventional paints is controlled by employing thinners, such as turpentine, mineral or petroleum spirits and coal tar products as for example toluene, xylene, and solvent naphtha, while paints containing synthetic resins require the use of chlorinated solvents.

Generally, conventional paints contain about 23–30% drying oils, 5 to 7% thinner and drier and 60–70% pigment. The pigment may be natural or synthetic, organic or inorganic, opaque or non-opaque, white or colored, chemically active or inert. Basic carbonate white lead, basic sulphate white lead, zinc oxide, leaded zinc oxide, titanium dioxide and lithopone are commonly employed for making white paint which may then be tinted to provide a variety of colors.

The water-based or thinned paints are characterized as comprising a vehicle and, a mixture of glue and pigment, or casein combined with calcimine, a pigment and a solubilizing agent, and also include Portland cement base paints. The vehicle may be water, while in the case of emulsion paints, the vehicle is generally an emulsion of water and oil or varnish or water and a synthetic rubber latex.

A varnish is characterized as comprising a solution of resin in a volatile solvent, as in the case of spirit varnish, or a solution of resin, volatile solvent and drying oils as in the case of oleoresinous varnish.

Enamel paints differ in composition from the conventional paints described above in that varnish is generally employed as the liquid carrier for the pigment and provides a surface which is generally harder, smoother, and glossier. A typical enamel paint may comprise from about 30–40% pigment and 60–70% vehicle, the latter of which may, for example, include about 50–55% soya alkyd and 45–50% mineral spirits and driers.

Cellulose crystallite aggregates are small disintegrated aggregates of level-off D.P. cellulose. These small disintegrated aggregates, their properties and a method of disintegrating the level-off D.P. cellulose are described in United States Patent 2,978,446, issued April 4, 1961. They are acid-insoluble products produced by the controlled acid hydrolysis of cellulose and the level-off D.P. value reflects a destruction of the original fibrous structure of the cellulosic source material. The term "level-off D.P." has reference to the average level-off degree of polymerization of the cellulose product measured in accordance with the paper by O. A. Battista entitled, "Hydrolysis and Crystallization of Cellulose," vol. 42, Industrial and Engineering Chemistry, pages 502-7 (1950).

As described in the foregoing patent, a cellulose material is subjected to a controlled acid hydrolysis to dissolve amorphous forms of cellulose leaving as a residue cellulose crystallite aggregates. The cellulose is subjected to the hydrolysis treatment for a time and at a temperature sufficient to disrupt the continuity of the fine structure. One such method comprises treating the cellulose with a 2.5 normal hydrochloric acid solution for 15 minutes at the boiling temperature of the solution. Another suitable method involves treating the cellulose with a 0.14 normal (0.5%) hydrochloric acid solution at 121° C. under pressure for 1 hour. In accordance with the method as described in the patent, the insoluble residue is preferably washed free of acid.

It may be observed that "crystallite," as used herein, is a cluster of longitudinally disposed, closely packed cellulose chains of molecules, and the "aggregates" are clusters of crystallites. The aggregates may also be said to comprise straight, rigid, relatively, non-twistable groups of linear chains. As indicated by X-ray diffraction tests, the crystallites and crystallite aggregates have a sharp diffraction pattern indicative of a substantially crystalline structure. Although the crystallite chains are of very uniform lengths, particularly by comparison with the original cellulose chains, strictly speaking they do exhibit some variation, and for the reason it is preferred to speak of average length, or of average level-off D.P. values.

The hydrolysis methods noted above are particularly characterized in that in each crystalline aggregate resulting from the hydrolysis, no constituent chain is connected to a chain in a neighboring aggregate; rather, all the chains in an agregate are separate from and free of those in neighboring aggregates.

The cellulose crystallite aggregates, or level-off D.P. cellulose, suitable for use in the invention is characterized by having a preferred average level-off D.P. of 125 to 375 anhydroglucose units. Ideally, within this range all of the material should have the same D.P., or chain length, but as this is difficult if not impossible to achieve, it is preferred that at least 85% of the material have an actual D.P. not less than 50 and not more than 550. More preferably, at least 90% of the material should have an actual D.P. within the range of 75 to 500, and it is still more preferred if at least 95% of the material has an actual D.P. in the range of 75 to 450. It may thus be apparent that the chain length of the level-off D.P. cellulose or cellulose crystallite aggregates, is very uniform, a consequence of the hydrolysis, wherein the longer chains of the original cellulose were converted to shorter chains and the very short chains were dissolved away. In short, the hydrolysis effected a homogenization of the chain length distribution. As may also be apparent, a reference to crystallite aggregates having an average level-off D.P. of 125 means that the aggregates have an average chain length corresponding to 125 anhydroglucose units, and in accordance with the first preference noted above, at least 85% of this material will be made up of chains containing 50 to 550 such units; the remaining 15% may comprise shorter and/or longer chains.

More preferably, the average level-off D.P. is in the range of 200 to 300, of which material at least 90% has an actual D.P. in the range of 75 to 550.

Associated with the foregoing D.P. properties of the crystallite aggregates is the fact that their chemical purity is very high, the material comprising at least 95%, preferably at least 97% to 99%, polyglucose, or anhydroglucose units, based on chromatographic analysis. In terms of ash content, the agregates preferably contain less than 100 p.p.m. (parts per million), although ash may range from about 10 to about 400 to 500 or 600 p.p.m. By comparison, conventional fibrous cellulose may have 1000 to 4000 p.p.m. of ash. In connection with the purity of the aggregates, it may be explained that the inorganic contaminants in the original cellulose, which are concentrated in the amorphous regions thereof, are dissolved away by the hydrolyzing acid, and the noncellulose components of the original material are so effectively destroyed that their concentration is reduced to a very low level.

The aggregates resulting from the hydrolysis and washing step are further characterized by having a particle size in the range of 1 or 2 to 250 to 300 microns, as determined visibly by microscopic examination. By subjecting the foregoing product to a mechanical disintegration, as described below, there is produced a material having a size in the range of less than 1 to about 250 or 300 microns. Within this range, it being understood that the particle size and size distribution will be selected to suit a particular end use. In general, mechanically disintegrated particles are preferred.

The source material for the crystallite aggregates may suitably be one or more natural fibers such as ramie, cotton, purified cotton, also bleached sulfite pulp, bleached sulfate wood pulp, etc. Particularly suitable are sulfite pulp which has an average level-off D.P. of 200 to 300, at least 90% of which has a D.P. in the range of 75 to 550; and also sulfate pulp which has an average level-off D.P. of 125 to 175, at least 90% of which is in the range of 50 to 350.

Other suitable cellulose crystallite aggregates may have lower average level-off D.P. values, say in the range of 60 to 125, or even 15 to 60. Aggregates from both of these ranges have the chemical purity and other characteristics of the aggregates from the first noted D.P. range. Crystallite aggregates in the 60 to 125 average level-off D.P. range are obtainable from the acid hydrolysis of alkali-swollen natural forms of cellulose, of which a preferred source is cellulose that has been mercerized by treatment with 18% caustic soda solution at 20° C. for two hours. Aggregates in the 15 to 60 average level-off D.P. range are suitably prepared from regenerated forms of cellulose, including tire and textile yarns, other regenerated cellulose fibers, and cellophane.

In general, the cellulosic source material has a D.P. greater than the level-off thereof.

As obtained from the acid hydrolysis and water washing steps, the aggregates in the over-all average level-off D.P. range of 15 to 375 are in a loosely aggregated state, particularly in the larger sizes, say from 40 to 250 or 300 microns, and are characterized by the presence of many cracks in their surfaces, including similar surface irregularities or phenomena like pores, depressions, voids, fissures and notches. Because of such irregularities, the apparent or bulk density of the aggregates is much less than their absolute density. Furthermore, the cracks and other irregularities persist despite the application of high compressive forces on the aggregates. Expressed in grams per cubic centimeter, when they are compressed at 5,000 p.s.i., they exhibit an apparent density of 1.26; at 10,000 p.s.i., the apparent density rises to 1.32; at 15,000 p.s.i. it is 1.34; and at 25,000 and 37,000 p.s.i. it is 1.38 and 1.38 respectively. On the other hand, the absolute density of a unit crystal or a crystalline is 1.55 to 1.57 from which it is apparent that the aggregates occlude considerable quantities of air in the surface cracks, voids, fissures, etc. The apparent densities of the dried disintegrated aggregates, at the compressive forces noted, are somewhat higher than the foregoing values.

Either before or after mechanical disintegration the aggregates may be dried. Where the disintegration is performed in the presence of an aqueous medium, drying is preferably carried out after the disintegration step. Drying may be done in any suitable vacuum, or in air at room temperature or higher, going up preferably to 60° C. to 80° C., although the temperature may be up to 100° C. or 105° C. or higher. Another procedure is to displace the water in the wet aggregates, preferably by means of a low boiling, water miscible organic compound such as a low molecular weight aliphatic alcohol-like methanol, ethanol, propanol, isopropanol, etc., and then to evaporate off the compound. The resulting dried aggregates tend to be more reactive and, as described below, to form stable dispersions and gels more readily. Spray drying either in air or in a vacuum is also satisfactory. Spray drying, and also freeze drying and drum drying, are particularly effective to dry the aggregates after the disintegration step. Freeze drying in particular favors the development of a very porous material which is characterized by the presence therein of a multiplicity of pores or depressions of extremely small size.

Mechanical disintegration of the aggregates, as referred to above, may be carried out in several ways, as by subjecting them to attrition in a mill, or to a high speed cutting action, or to the action of high pressures on the order of at least 5,000 or 10,000 p.s.i. The disintegration of the aggregates is carried out in the presence of a liquid medium, although where high pressure alone is employed, such medium, although desirable, is not necessary. Water is a preferred medium. Whatever method is used, the disintegration is carried out to such an extent that the resulting disintegrated aggregates are characterized by forming a stable suspension in an aqueous medium in which they are being attrited, or in which they may be subsequently dispersed. By a stable suspension is meant one from which the aggregates will not settle but will remain suspended indefinitely and requires that at least 1% of the weight of the aggregates have a particle size not exceeding about 1 micron. The disintegrated aggregates are additionally characterized by the fact that such suspension forms an extremely adherent film when deposited on a glass panel or sheet or other suitable surface. At lower concentrations of aggregates, the suspension is a dispersion, while at higher concentrations it is a gel.

The aggregates are fused in finely divided form, preferably having a particle size ranging from less than 1 micron to 250 or 300 microns. Within the foregoing range the particle size and size distribution are variable, it being understood that these quantities will be chosen to suit a particular paint-containing material and/or a particular desired end use for the resulting mixtures. For example, the aggregates may comprise particles having one or two dimensions of a size ranging up to 250 to 300 microns; or they may comprise particles of a finer size, say particles whose dimensions are all below 100 mircons, or below 40 or 50 microns; or a mixture of the two foregoing materials may be taken. Illustrative of the foregoing larger sized material is a fraction of crystallite aggregates having a particle size in the range of 40 to about 250 or 300 microns; such a material may be prepared by subjecting the product of acid hydrolysis to mechanical disintegration to produce a material having a size in the range of less than 1 to about 250 or 300 microns, and then fractionating such product as by mechanical sifting, or by settling in water, the larger particles settling to a greater extent than the smaller. The fraction in the range of about 40 to 250 or 300 microns is of special interest because of the finding that particles in this size range, particularly those having one or two dimensions of up to 250 or 300 microns, tend to have cracks, fissures, notches, and the like in their surfaces.

Derivatives of cellulose crystallite aggregates which are essentially topochemical derivatives possess physical characteristics and properties similar to those of cellulose crystallite aggregates. For example, the derivatives have about the same D.P. and a size in the same particle size range as the crystallite aggregates from which they have been formed, and the disintegrated derivatives have dispersibility and gel-forming characteristics similar to those of the disintegrated cellulose crystallite aggregates. Chemically, the degree of substitution (D.S.) is at least 0.01. The D.S. has reference to the total degree of substitution which may include both hydrophilic and hydrophobic substituents. The derivatives may be formed from disintegrated cellulose crystallite aggregates and will have a particle size ranging from below 1 micron to about 250 microns depending directly upon the particle size of the aggregates. Alternatively, the derivatives may be formed from non-disintegrated aggregates and subsequently disintegrated. Where the D.S. is sufficiently low so that the derivatives are water-insoluble and/or organic solvent-insoluble, the disintegrated aggregates derivatives have a unique and distinguishing characteristic, like that of the disintegrated crystallite aggregates, in their ability to form stable dispersions in non-solvent liquid media, which media is capable of partially swelling the disintegrated aggregates, providing that the derivatives constitute at least about 0.5% by weight of the dispersion and at least 1% of the weight of the dispersed aggregates derivatives have a particle size not exceeding about 1 micron.

The derivatives containing hydrophilic substituents are water-sensitive and the ease with which aqueous dispersions or suspensions may be formed is dependent directly on the water-sensitivity of the derivative. For example, a stable aqueous dispersion of a water-insoluble hydroxyethyl derivative may be formed more easily and readily than a corresponding stable dispersion or suspension of the cellulose crystallite aggregates because the hydroxyethyl cellulose is more sensitive to water than the cellulose crystallites themselves. The appearance and nature of the dispersion or suspension will also vary with the water-sensitivity of the derivative. Where the D.S. of a derivative having a hydrophilic substituent is not more than about 0.1 to about 0.2, the dispersion of the disintegrated derivatives will have about the same appearance as a corresponding dispersion of disintegrated cellulose crystallite aggregates. For example, dispersions or suspensions of disintegrated sodium carboxymethyl or hydroxypropyl derivatives of the aggregates having a D.S. of about 0.1 have the same white glistening appearance as a corresponding dispersion of the disintegrated aggregates. As the D.S. of the disintegrated derivative is increased, as for example to a D.S. of about 0.3, the dispersion has a more translucent appearance and where the D.S. is about 0.4, the dispersion has an appearance approaching that of white petrolatum.

Where the aggregates derivatives contain hydrophobic substituents, the disintegrated derivatives may be dispersed or suspended in various organic solvent systems in which they are insoluble but in which they are partially swollen. In forming stable dispersions of this group of derivatives, the ease of formation of a stable dispersion or suspension will vary with the sensitivity of the derivative to the organic solvent and the appearance of the dispersions will vary with the degree of substitution in a manner similar to that of the aqueous dispersions of the water-sensitive derivatives. For example, a stable dispersion (1%) of the disintegrated acetate derivative (D.S.—2.0) may be formed in acetone. Similarly, a stable dispersion of 1% (by weight) ethyl cellulose (D.S.—1.5) may be formed in methyl ethyl ketone.

A wide range of derivatives of the cellulose crystallite aggregates are satisfactory for the purposes of this invention and these derivatives are disclosed in copending application of Battista et al. Serial No. 2,133, and now U.S. Patent No. 3,111,513 and Battista et al., applications Serial No. 2,134 and Serial No. 2,135, both now abandoned and all filed January 13, 1960. These derivatives include, for example, oxidation derivatives containing 1 or more carbonyl linkages including aldehyde, carboxyl and mixed aldehyde-carboxyl derivatives; ether derivatives characterized by having one or more —OR groups where R may be an aliphatic or substituted aliphatic radical, either a straight or branched chain containing from 1 to 12 or more carbon atoms, an aryl or aralkyl or substituted aralkyl radical or a carboxyalkyl, hydroxyalkyl, cyanoalkyl, alkoxyalkyl, aralkyloxyalkyl, or a dialkylaminoalkyl radical; and ester derivatives, for example, esters of inorganic acids such as the nitrates, nitrites, thiocyanates and phosphates and esters of organic acids such as the formates, acetates, propionates, butyrates, mixed acetate-propionates, mixed acetate-butyrates, other aliphatic acid derivatives containing up to 18 or more carbon atoms and aryl or aralkyl esters such as, for example, benzoates, phenyl acetate esters, phthalate esters, naphthonates and the like.

For the purposes of the present invention, the cellulose crystallite aggregates and the water-insoluble and/or organic solvent insoluble aggregates derivatives having physical characteristics and properties similar to those of the cellulose crystallite aggregates are equivalents. In the succeeding discussion, the terms "cellulose crystallite aggregates," "crystallite aggregates" and "aggregates" issued to designate both the cellulose crystallite aggregates and the aggregates derivatives.

As previously noted, only simple mixing is required to form a mixture of film-forming or paint material and crystallite aggregates. The amount of aggregates used for preparing a mixture is variable, depending upon the particular film-forming material employed; however, a preferred amount of aggregates is about 13 to 45% by weight of the mixture, and a broader range is about 10 to 75%. Even wider ranges are suitable, depending upon the particular properties and/or physical characteristics desired in the end product. For example, a relatively small amount of crystallite aggregates, say less than 5%, may be added to a conventional paint or varnish to provide for a slower and more uniform drying rate, as a thickener, or where a slight texturized film, both from the standpoint of the appearance and touch, is desired.

By controlling the concentration of the aggregates in the film-forming material, the paint-forming mixture may be rendered thixotropic or in the form of a reversible gel. In this condition the paint-forming mixture, when at rest, is of a gel consistency and will not run out of the container if the latter is accidentally toppled over. Upon agitation, as for example by the mere dipping of the paint brush, sufficient shear is created in the paint-forming mixture to reduce its viscosity sufficiently to liquefy it and allow the same to be taken up by the brush bristles. As the agitation is stopped, the mixture reverts to its original gel consistency.

On the other hand, by gradually increasing the amount of crystallite aggregates to about 50% or more it is possible to change the consistency of the paint-forming mixture to a stiff or thick and heavy plastic paste and subsequently to a free-flowing particulate mass which does not transfer color to contacting surfaces and is substantially or apparently dry in the sense that it is non-wetting to the touch.

The resulting pastes and substantially dry free-flowing paint-forming mixtures remain quite stable for extended periods even under conditions at which conventional paints and varnishes rapidly deteriorate. Storage periods of not more than three months and storage temperature of about 70° F. generally recommended for conventional paints are not applicable or necessary for the paint and varnish mixtures of the present invention. Even at temperatures well above 70° F. there is no tendency for the paint pigments and other solids of the paint-forming mixtures to settle during storage into layers of more or less solid sediment. Aside from the ease of mixing, the absence of sedimentation eliminates accompanying disadvantages, such as reduction of covering power and differences in color shades and finishes which may affect not only the decorative but also the protective value of the paint or varnish. In areas where low or chilling temperatures are often encountered, the paint-forming mixtures do not require the rigid storage conditions which are recommended for conventional paints to prevent the same from congealing or breaking down, as in the case of emulsion paints, and to avoid loss of pigment floatability.

In preparing the paint-forming mixtures which are of a paste or free-flowing particulate or granular character it is believed that the paint is held by the crystallite aggregates by both absorptive and adsorptive forces, and that the paint is thus "dried" by the aggregates, so to speak; also the paint vehicle is thereby protected against loss. Another advantage of these paint-forming mixtures is the absence of abnormal increases of consistency and, often, the formation of very stiff pastes or hard masses normally encountered with conventional paints. This result can be best attributed to the sorptive retention of the paint vehicle by crystallite aggregates. By sorption is meant the absorption and/or adsorption of the paint ingredients, particularly the liquid ingredients, on and in the aggregates. It is thought that sorption of the paint vehicle by the aggregates minimizes contact, and thus the opportunity, for chemical reactions to take place between the strong basic pigments generally employed and the acid paint vehicle or flocculates, in the case of a paint vehicle which incorporates a polymerized oil.

During the initial mixing, the size of the crystallite aggregates may be varied in accordance with the texture desired in the finished surface. The aggregates employed may be dry or alternatively in a wet or never-dried condition. When crystallite aggregates which have never been dried are employed in the paint-forming mixture, the resulting painted surface generally has a more accentuated textured finished surface, in both appearance and feel, than that attained with paint-forming mixtures incorporating dried aggregates. The paints reconstituted from paint-forming mixtures comprising either dry or never-dried crystallite aggregates exhibit more uniform and slower drying rates than corresponding conventional paints, which are particularly pronounced in the case of water-based paints by improved covering power and the absence of lap marks in the finished surface.

The terminology "paint-forming mixtures" as employed throughout the description and claims is intended to cover mixtures of cellulose crystallite aggregates and conventional oil-based paints, including enamel paints, water and emulsion-based paints, varnishes and like film-forming materials.

This invention may be illustrated by the following examples:

*Example I*

About 215 gms. of a turquoise colored, interior, water-based paint containing latex was placed in a mixing bowl and powdered cellulose crystallite aggregates were slowly added, with the mixture being stirred by a Dormeyer electric mixer. The crystallite aggregates had a level-off D.P. of 220 and comprised air-dried material containing about 4% water. The aggregates had a particle size in the range of below 1 to 250 microns, of which about 10% had a size below 44 microns, and the balance were above 74 microns. The water-based paint employed is commercially available and comprised 42.7%, by weight, of pigment and 57.3%, by weight, of vehicle to which was added a small amount of tinting material (less than 5% by weight of the paint). The paint pigment itself comprised, on a weight basis, 77.3% of titanium oxide and and 22.7% calcium carbonate, while the vehicle included 37.3% water and 12.7% synthetic rubber latex.

As the crystallite aggregates were slowly added to and stirred with the paint, the mixture thickened gradually into a paste which became progressively stiffer until a mass of dough consistency was formed. The mass began to break or crumble into granules of more or less spherical shape and, with the continued addition of the crystallite aggregates, the granules progressively became smaller. After the addition of about 92 gms. of the crystallite aggregates, the mixture was considered to be dry, and was in the form of free-flowing particles of generally spherical shape which were of from 1 to 2 millimeters in diameter. On pouring some of the mixture onto the palm of the hand there was no tendency for the particles to conglomerate, and it was noted that the particles did not transfer any paint to the hand.

A portion of the particulate mixture of paint and crystallite aggregates was manually stirred into 100 ml. of water until the resulting mix assumed the approximate consistency of the original paint. A total of 100 gms. of the particulate mixture was employed for this purpose. The resulting mix or reconstituted paint was then applied by brush onto one side of a clean and dry glass panel. In comparison with the original paint, the reconstituted paint had less tendency to flow or drip from the brush, yet was easily spread over the panel surface. The panel was then air-dried at room temperature, with the reconstituted paint having a drying rate approximately the same as that of the original paint. When dried, the painted panel surface had a roughened or matted appearance, resembling a texturized paint.

*Example II*

About 210 gms. of the original water-based paint used in Example I was mixed with about 160 gms. of crystallite aggregates which were of the type described in Example I except that they had never been dried. The moisture content of these never-dried crystallite aggregates was about 64%, by weight. Mixing was carried out as in Example I, with the crystallite aggregates being slowly added to and continuously stirred with the paint until a smooth and thick plastic paste was obtained. By weight, the paste contained about 16.5% of crystallite aggregates. It was found that this paste remained in place when applied and spread as a putty over vertical surfaces by means of a spatula. When touched, no paint was transferred from the paste to one's fingers.

A mix or reconstituted paint having approximately the same consistency as the original paint was formed from the paste by mixing 100 gms. of the same with 150 ml. of water. The paste was easily redispersed with the water and a homogeneous mix was rapidly attained. The reconstituted paint was brushed onto a clean and dry glass panel and was easily spread over one side thereof. In air-drying at room temperature, the reconstituted paint had a drying rate approximately the same as the original paint. The dried painted surface was smooth in appearance and feel and exhibited good color uniformly throughout.

*Example III*

An oil-based, interior gloss enamel paint, in the amount of 225 gms. was mixed with air-dried crystallite aggregates employing the mixing procedure and the type of aggregates as described in Example I. The enamel paint is commercially available and was comprised of white lead pigment, which was dispersed in a vehicle of conventional varnish, and a tint which imparted a blue color to the paint. Upon the addition of 150 gms. of crystallite aggregates to the paint, a free-flowing particulate mixture was formed containing 38.4% of crystallite aggregates, by weight. When touched, the mixture did not transfer paint nor feel wet to the fingers.

With manual stirring, 65 ml. of paint thinner, comprising mineral spirits, was added to 100 gms. of the particulate mixture of paint and crystallite aggregates to provide a mix or reconstituted paint having approximately the same consistency as the original enamel paint. As in the previous examples, the reconstituted paint was applied and easily spread over one face of a clean and dry panel and was air-dried at room temperature. The drying rate was similar to that of the original enamel paint. The dried, painted surface had a rough or textured appearance but possessed a hardness and gloss similar to that achieved with the original enamel paint.

*Example IV*

Employing the technique and the original enamel paint described in Example III, about 210 gms. of paint was mixed with about 160 gms. of crystallite aggregates which had never been dried, as used in Example II, giving a thick or stiff and heavy plastic paste containing 16.5% of crystallite aggregates, by weight. On dispersing 100 gms. of the plastic paste in 65 ml. of paint thinner of mineral spirits, a reconstituted paint was obtained having the approximate consistency of the original enamel paint. The paint was applied to one face of a clean and dry glass panel and dried, providing a hard and glossy surface which had a more pronounced textured or roughened appearance than those described in Example III. With further comparison to Example III, it was noted that dispersion of the plastic paste in the paint thinner required slightly more agitation and that easy spreading of the reconstituted paint was less apparent.

*Example V*

The original enamel paint as used in Example III, in the amount of 215 gms., was slowly mixed with 144 gms. of dried hydroxyethyl derivative of the crystallite aggregates having a D.S. of about 0.1 to provide a free-flowing particulate mixture. Accompanied with further stirring, 3.7 gms. of "Tween 80," an emulsifying agent comprising a sorbitan monooleate polyoxyalkylene derivative, was added to the particulate mixture and had no apparent effect on its free-flowing characteristics. A 100 gm. portion of this mixture, containing about 39% of the derivative, by weight, was readily dispersed with 65 ml. of mineral spirits paint thinner and provided a mix which had the approximate consistency of the original enamel paint. The reconstituted paint was brushed onto a glass panel and was spread easily over one face. Upon drying, the painted surface was hard and glossy and exhibited a fine texture in both appearance and feel.

*Example VI*

A thick or stiff and heavy plastic paste was formed by mixing 205 gms. of the original enamel paint used in Example III and 250 gms. of crystallite aggregates which had never been dried and as described in Example II. The plastic paste was then thoroughly blended with 9.0 gms. of the emulsifying agent "Tween 80," as used in Example V, and at this stage the paste was comprised of 20.47% of crystallite aggregates, by weight. Dispersion of 100 gms. of the plastic paste in 75 ml. of mineral spirits paint thinner was readily achieved and formed a mix having the approximate consistency of the original enamel paint. The reconstituted paint was spread with ease over one face of a glass panel and, when dried, provided a hard covering of increased gloss and noticeably less roughness than that described in Example IV.

*Example VII*

About 210 gms. of the original enamel paint of Example III was stirred with 3.5 gms. of the emulsifying agent "Tween 80" used in Example V. Independently of this blend, 150 gms. of dried crystallite aggregates, as employed in Example I, was blended with 3.5 gms. of dry CMC (carboxymethylcellulose). The two blends were then combined with stirring and formed a free-flowing mixture of extremely fine particles comprising 39.24% of crystallite aggregates, by weight. A reconstituted paint of approximately the same consistency of the original enamel paint was formed by dispersing 100 gms. of the particulate mixture in 65 ml. of mineral spirits paint thinner and was then applied to one face of a glass panel. Dispersion of the mixture was readily achieved and the ease in spreading the reconstituted paint on the glass panel was comparable to that of the original enamel paint. Upon drying, the painted surface of the glass panel became hard, glossy and smooth in appearance and feel and resembled a painted surface as provided by the original enamel paint.

The substitution in the foregoing examples of disintegrated water-insoluble and/or organic solvent-insoluble aggregates derivatives having the properties and characteristics described hereinbefore for the cellulose crystallite aggregates of the examples forms similarly satisfactory products.

While preferred embodiments of the invention have been shown and described, it is to be understood that changes and variations may be made without departing from the spirit and scope of the invention as defined in the appended claims.

I claim:
1. A paint composition consisting of a flowable film-forming material having a liquid vehicle and which is capable of providing a continuous, solid, adherent covering when applied as a thin layer, and a disintegrated substance selected from the group consisting of disintegrated cellulose crystallite aggregates, disintegrated water-insoluble derivatives of cellulose crystallite aggreates and disintegrated organic solvent-insoluble derivatives of cellulose crystallite aggregates, the disintegrated substance being present in an amount at least sufficient to impart a texturized surface to the film-forming material when it is applied, the cellulose crystallite aggregates having an average level-off D.P. of from 15 to 375 anhydroglucose units.

2. A dry free-flowing paint composition consisting of flowable film-forming material having a liquid vehicle and which is capable of providing a continuous, solid, adherent covering as a thin layer and a disintegrated substance selected from the group consisting of disintegrated cellulose crystallite aggregates, disintegrated water-insoluble derivatives of cellulose crystallite aggregates and disintegrated organic solvent-insoluble cellulose crystallite aggregates for carrying the film-forming material in an apparently dry and particulate form, the cellulose crystallite aggregates having an average level-off D.P. of 15 to 375 anhydroglucose units, said composition being non-wetting to the touch and being reconstitutable into a liquid paint material upon the addition of a thinner for the film-forming material.

3. A paint paste composition consisting of a flowable film-forming material having a liquid vehicle and which is capable of providing a continuous, solid, adherent covering when applied as a thin layer, and a disintegrated substance selected from the group consisting of disintegrated cellulose crystallite aggregates, disintegrated water-insoluble derivatives of cellulose crystallite aggregates and disintegrated organic solvent-insoluble derivatives of cellulose crystallite aggregates, the disintegrated substance being present in an amount sufficient to carry the film-forming material as a thick plastic paste, the cellulose crystallite aggregates having an average level-off D.P. of 15 to 375 anhydroglucose units, said paste composition being reconstitutable into a liquid upon the addition of a thinner for the film-forming material.

4. A paint composition consisting of a flowable film-forming material having a liquid vehicle and which is capable of providing a continuous, solid, adherent covering when applied as a thin layer, and from 10 to 75% by weight of a disintegrated substance selected from the group consisting of disintegrated cellulose crystallite aggregates, disintegrated water-insoluble derivatives of cellulose crystallite aggregates and disintegrated organic solvent-insoluble derivatives of cellulose crystallite aggregates which serve as a carrier for the film-forming material, the cellulose crystallite aggregates having an average level-off D.P. of 15 to 375 anhydroglucose units.

5. A composition as defined in claim 4 wherein said disintegrated substance comprises from 13 to 45% of the composition by weight.

6. A composition as defined in claim 5 wherein the disintegrated substance has a particle size in the range of less than 1 micron to 300 microns.

7. A composition consisting of a flowable liquid paint and a disintegrated substance selected from the group consisting of disintegrated cellulose crystallite aggregates, disintegrated water-insoluble derivatives of cellulose crystallite aggregates and disintegrated organic solvent-insoluble cellulose crystallite aggregates which serve as a carrier for the paint and comprise from 10 to 75% of the composition by weight, the cellulose crystallite aggregates have an average level-off D.P. of 15 to 375 anhydroglucose units, said composition being reconstitutable into a free-flowing liquid upon the addition of a thinner for the flowable paint.

8. A composition as defined in claim 7 wherein the paint is an oil base and wherein the disintegrated substance comprises from 13 to 45% of the composition by weight.

9. A composition as defined in claim 8 wherein the disintegrated substance has a particle size in the range of less than 1 to about 300 microns.

10. A composition as defined in claim 9 wherein the disintegrated substance is disintegrated cellulose crystallite aggregates.

11. A composition as defined in claim 7 wherein the paint is a water-base paint and wherein the disintegrated substance comprises from about 13 to 45% of the composition by weight.

12. A composition as defined in claim 11 wherein the disintegrated substance has a particle size in the range of less than 1 to about 300 microns.

13. A composition as defined in claim 12 wherein the disintegrated substance is disintegrated cellulose crystallite aggregates.

References Cited by the Examiner

UNITED STATES PATENTS

| | | | |
|---|---|---|---|
| 1,656,198 | 1/1928 | Heyl | 106—204 |
| 1,964,772 | 7/1934 | Schur et al. | 106—163 |
| 2,293,038 | 8/1942 | Auer | 106—171 |
| 2,978,446 | 4/1961 | Battista et al. | 260—212 |

ALEXANDER H. BRODMERKEL, *Primary Examiner.*

MORRIS LIEBMAN, *Examiner.*

A. LIEBERMAN, D. J. ARNOLD, *Assistant Examiners.*